June 12, 1956     A. C. THOMSON     2,750,131
STEERING CONTROL FOR HELICOPTER
Filed June 11, 1951     3 Sheets-Sheet 1
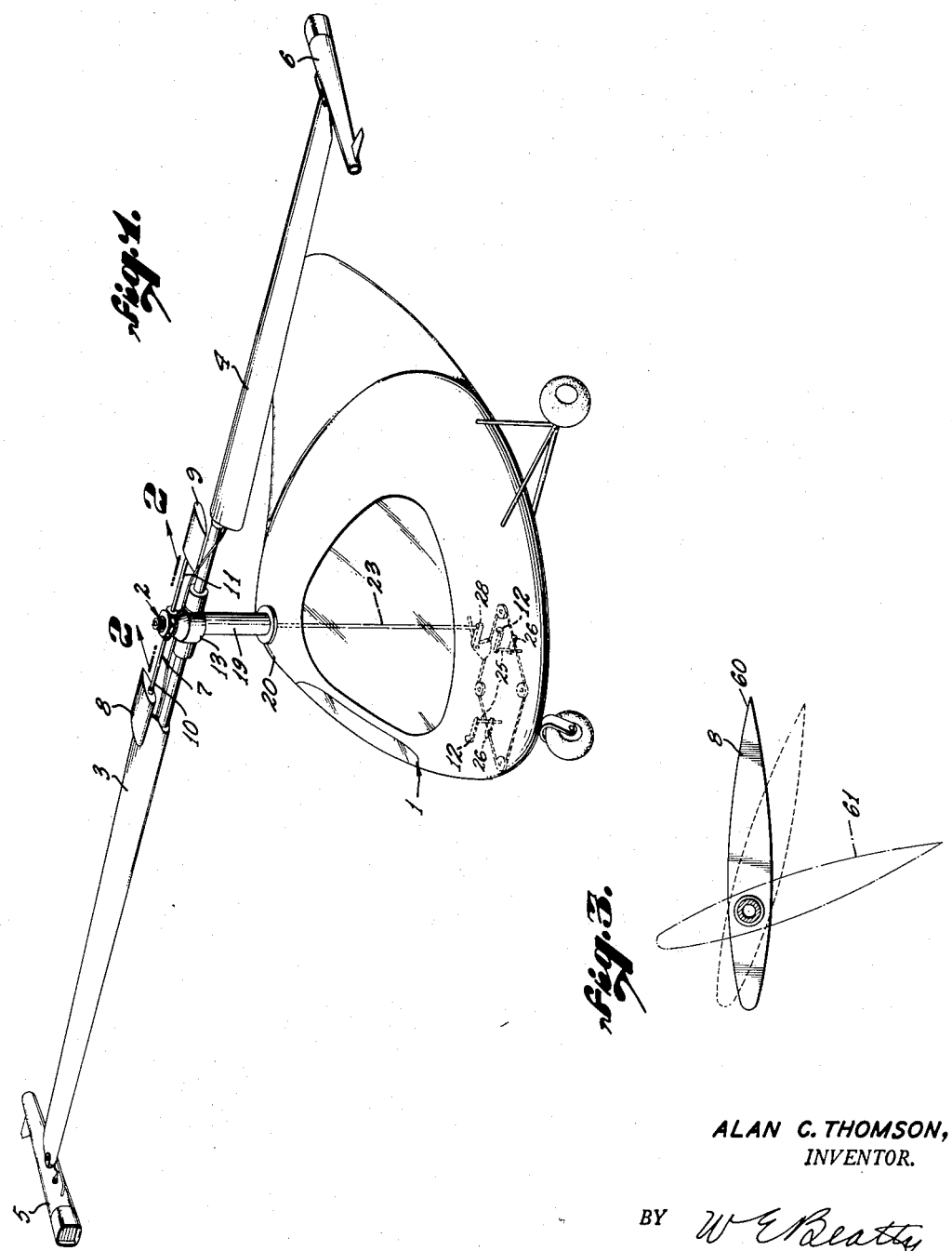
ALAN C. THOMSON,
INVENTOR.
BY *W. E. Beatty*
ATTORNEY.

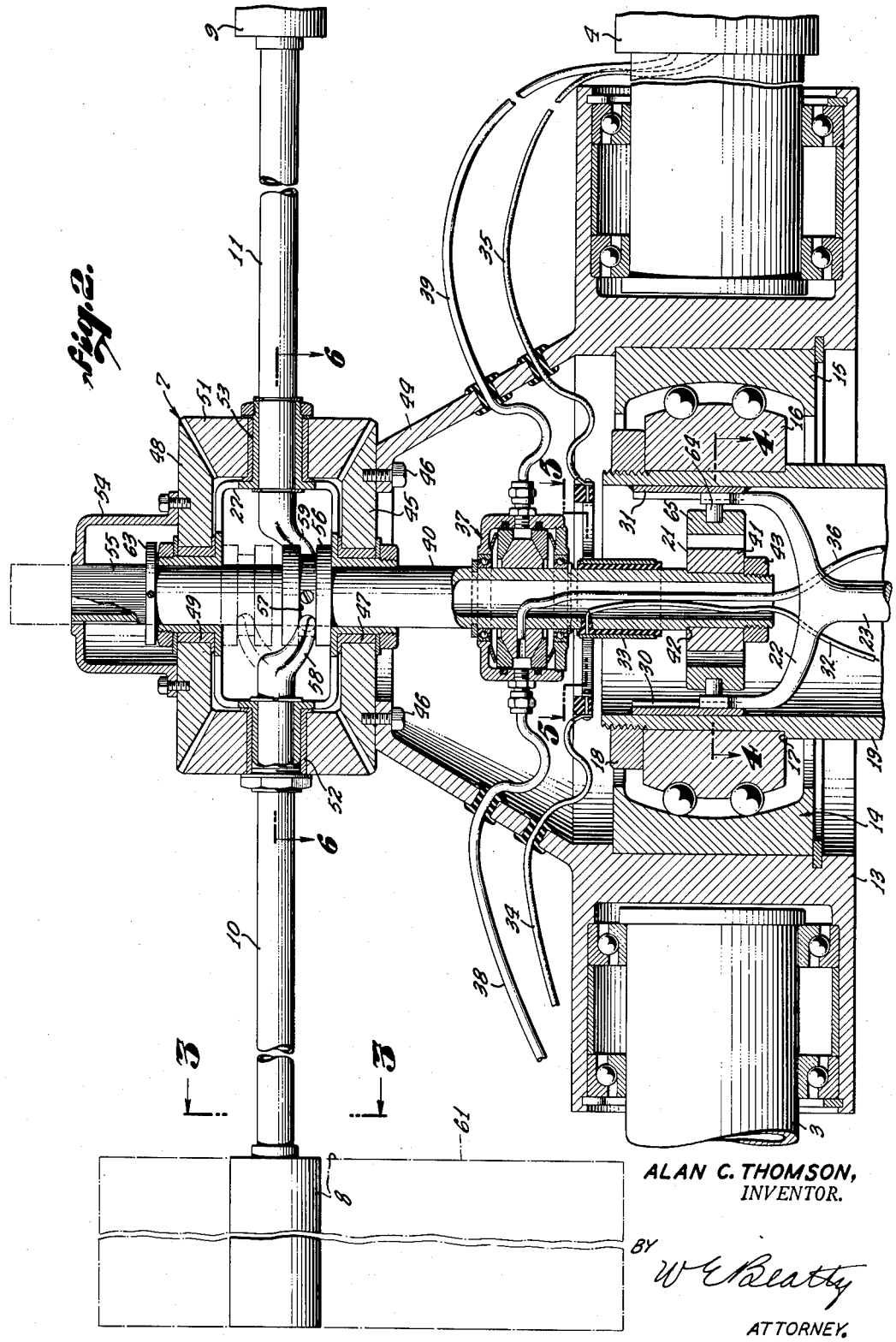

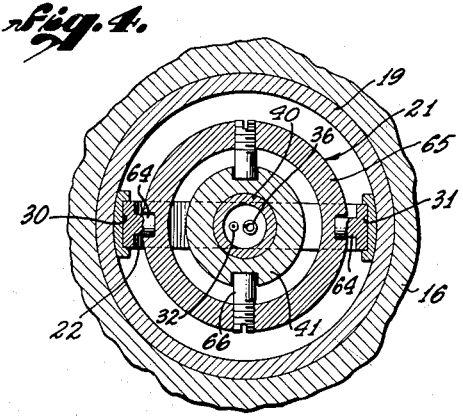
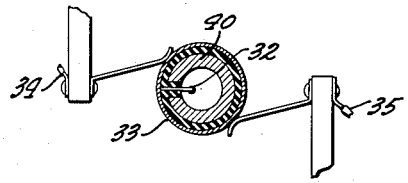
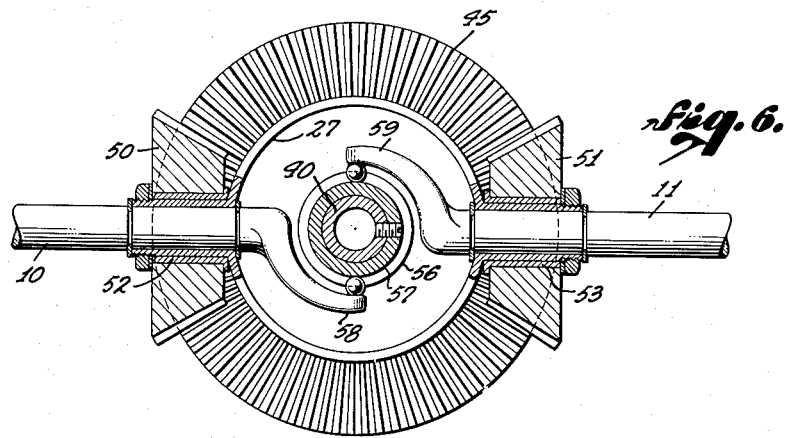
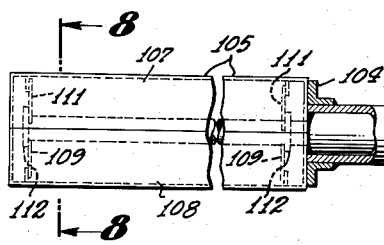
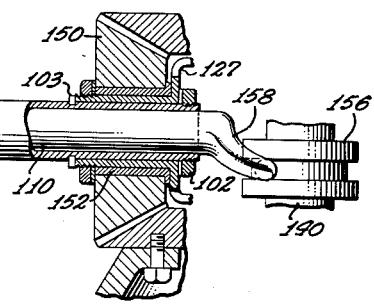
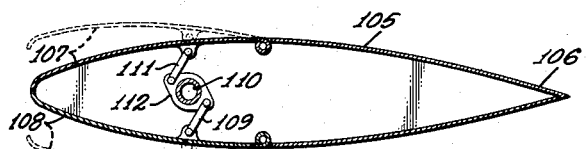
ALAN C. THOMSON,
INVENTOR.
BY W. E. Beatty
ATTORNEY.

United States Patent Office 2,750,131
Patented June 12, 1956

2,750,131
STEERING CONTROL FOR HELICOPTER

Alan C. Thomson, Manhattan Beach, Calif.

Application June 11, 1951, Serial No. 230,908

10 Claims. (Cl. 244—17.19)

The invention relates to a steering control for helicopter. An object of the invention is to provide a more positive and lighter directional control for helicopter, particularly for jet powered helicopter rotors.

The conventional means of turning helicopters using jet powered rotors is by a canted hinge tail. By having the hinge axis on an angle, the downwash is deflected and the reaction forces the tail around, thus turning the machine. This necessitates having a long tail boom extending out from the fuselage to support this tail, adding weight and increasing necessary storage space. The steering control of this invention eliminates the canted hinge rudder and supporting structure. It is centered on the rotor hub and is out of the way, requiring no additional storage space.

An object of the invention is to steer the helicopter by providing a turning moment or torque which is derived from the rotation of the rotor, with provisions for changing the amount and direction of such turning moment or torque.

This is accomplished by providing a torque arm which bears on a member fixed with relation to the fuselage, at a point spaced from the axis of the hub. This torque arm may have no torque applied to it in the case where no steering is required, or in other cases this torque arm may have torque applied to it in either one of opposite directions, the amount being under the control of an operator, and the torque being obtained from the rotation of the hub.

In the preferred case, the transmission is in the form of a bevel gear driven by the rotor hub, an opposite bevel gear which drives the torque arm, and interposed pinion gears each having a paddle device. The pitch of the paddles is controlled by the operator in order to change the drive coupling between the two bevel gears. If the paddles have no drag and the pinion gears do not rotate on their own axes, the torque arm bevel gear or driven gear rotates in the same direction as the hub gear. As the pinion gear rotates in the same direction as the hub gear. As the pinion gears rotate on their own axes, the driven gear is caused to rotate in the opposite direction from the driving bevel gear. As the pinion gears rotate at one-half speed, the driven gear remains stationary. Intermediate speeds of the driven gear are obtained by adjusting the drag of the paddles on the pinion gears. These various conditions for the adjustment of the amount and direction of the turning moment are obtained by means of control of an operator for varying the pitch of the paddles to vary the drag on the pinion gears.

For further details of the invention, reference may be made to the drawings wherein:

Fig. 1 is a perspective view of a jet powered helicopter having the steering control of this invention.

Fig. 2 is an enlarged sectional view on line 2—2 of Fig. 2.

Figs. 3, 4, 5, and 6 are sectional views on lines of the corresponding numbers in Fig. 2.

Fig. 7 is a side view in elevation, partly in section, and with parts broken away, of a modified form of paddle.

Fig. 8 is an enlarged section view on line 8—8 of Fig. 7.

All views are in the direction of the respective arrows.

Referring to the drawings, the helicopter 1 has a rotor 2, having blades 3 and 4, terminating in jet engines 5 and 6. The steering control 7, of this invention has paddles 8 and 9, on arms 10 and 11, which are short so that the paddles 8 and 9 are in a favorable air current which is less turbulent than the air currents acting on the much longer hinged tail formerly used. The pitch or angle of attack of the paddles 8 and 9 is under the control of the operator, pedals 12, being provided for this purpose. As shown in Fig. 2, the directional control device 7, is mounted on the rotor hub 13. Hub 13 has a self aligning teeter bearing 14, having an outer bearing member 15 fixed to the hub 13 and an inner bearing member 16 fixed against shoulder 17, by nut 18, on the upper end of a hollow post 19, arising from and fixed to the top of fuselage 20. Inside of post 19 is a universal coupling 21 concentric with teeter bearing 15, 16. Coupling 21 is between the fork 22, and at the upper end of the rod 23, which moves up and down under control of pedals 12 to change the pitch of paddles or blades 8 and 9. Rod 23 is urged downwardly by right pedal 12, see Fig. 1, and upwardly by left pedal 12. Pedals 12 are pivoted as indicated at 25 and include arms 26 which control cable rotating arm 28, and reciprocating rod 23.

Fork 22 has slide bearings 30, 31 fixed in the upper end of post 19. The ignition wire 32 is led through a slip ring 33 and circuits 34 and 35, of the engines 5 and 6. The fuel line 36 is led through a rotary seal 37 having fuel lines 38, 39 for the engines 5 and 6. The circuit 32 and fuel line 36 extend through an axle 40 having its lower end fixed to gimbal ring 41 of coupling 21 between shoulder 42 and nut 43.

Fork 22 has a swivel connection 64, with gimbal ring 65, and at right angles thereto ring 65 has a swivel connection 66 with ring 41. The rings 41 and 65 and the slide bearings like 64 are on a radius having a center on the axis of stationary post 19 and comprise a torque arm or radius arm which acts on the abutments provided by the slide bearings 30 and 31, to turn the fuselage about its vertical axis which is the axis of the rotor hub 13. This torque arm 41, 65, 64 is operated by the turning force applied to axle 40 by the spline connection 55 between axle 40 and the housing 54 fixed to gear 48. The gears 45 and 48 and the pinions 50 and 51 provide an adjustable transmission which transmits a controllable turning moment variable in amount and direction to the axle 40, and derived from the rotation of the rotor hub 13. The rotor hub 13 by its rotation thus provides a rotatable source of power which can be varied as to its amount and direction in applying a turning moment to the torque arm 21, 65, 64.

The top of hub 13 has a hollow conical base or extension 44 to which is fixed a ring gear 45 by means of bolts like 46. Gear 45 has a bearing 47, on axle 40, and the opposite ring gear 48 has an aligned bearing 49, on axle 40. Between the gears 45 and 48 and meshing therewith are the opposite pinion gears 50 and 51. Gears 45, 48, 50, and 51 are held in alignment by a spider 27. Pinion gear 50 has a bearing 52 for arm 10 and pinion gear 51 has a similar bearing 53 for arm 11. The gear 48 has a spline housing 54 for splines 55 at the upper end of axle 40, so that gear 48 is stationary with reference to the fuselage 20, while gear 45 rotates with hub 13 to drive the pinions 50 and 51.

Fixed to the reciprocating axle 40, is a ring 56 having a channel 57 for the crank arm 58 on arm 10, and for the crank arm 59 on arm 11. Movement of axle 40 up or down along its own axis rotates arms 10 and 11 about their axes to change the pitch and reaction of the blades 8 and 9.

The operation is as follows. Assume the pilot wants to turn his helicopter about a vertical axis in the direction the rotor 2 is turning. Fork 22 is lowered by depressing the left rudder pedal 12 or by other convenient means. This brings paddles 8 and 9 to the position shown at 60 in Fig. 3. Being streamlined, they present very little drag and consequently do not restrain pinions 50 and 51 from riding around on gear 45. This in turn carries gear 48 around in the same direction as gear 45. Since gears 45 and 48 are both turning in the same direction, axle 40 is applying torque to the torque arm provided by rings 41 and 65 and swivel connection 64 which acts on the abutments provided by slide bearings 30 and 31 to turn post 19 which results in a turning of the fuselage 20 with the rotor 2.

Next let us assume that the pilot wants to turn in a direction opposite to that of the direction of rotation of jet rotor 2. He raises axle 40, increasing the angle of paddles 8 and 9 to position 61, Fig. 3, to produce a very high drag condition. The axis of pinions 50 and 51 tend to remain stationary, causing them to rotate and turn ring gears 45 and 48 in opposite directions. Therefore, the fuselage 20 and the rotor 2 turn in opposite directions.

The third condition would be when no turning is desired by the pilot. The pitch of paddles 8 and 9 would then be adjusted so that the drag just balanced the friction of the gear system and permitted the pinions 50 and 51 to rotate at one half rotor speed, producing no change in gear 48.

Assuming a rotor speed of 300 revolutions per minute to produce no directional change in the fuselage, the paddles 8 and 9 would be rotating at 150 R. P. M. To obtain a turning rate of 10 R. P. M. of the fuselage or a complete turn in six seconds, the paddles 8 and 9 would have to change to approximately 145 or 155 R. P. M. depending upon direction. It can be seen that quite small changes are sufficient to produce the required changes in the turning of the fuselage.

Another method of making a more positive turn in the direction of the rotor is by having a means of increasing the friction or drag between the gears 45, 48, 50, and 51, or these gears and spider 27. A means of accomplishing this is by having a drag disc or clutch 63 which is rigidly attached to axle 40 and moves up and down with it. When the axle 40 is moved down to decrease the drag in paddles 8 and 9 and have the gears turn as a single unit, the disc 63 engages the top portion of spider 27 and forces it to turn with gear 48.

A modification of the paddles 8 and 9 is shown in Figs. 7 and 8. In this case, the arm 110 is mounted and operated as described above, having a bearing 152 in pinion 150 and having a crank arm 158, operated by a collar 156 on reciprocating axle 140. Also there is a similar opposite arm, not shown, like the opposite arrangement of arms 10 and 11 in Fig. 2. Arm 110 rotates in tube 101 fixed to spider 127, by lock nut 102 and snap rings like 103. Tube 101 at its outer end has fixed thereto by brackets like 104 a hollow foil paddle or blade 105, having a closed trailing end 106, while its leading edge comprises movable members 107 and 108, having a connecting rod connection 109 and 111 at opposite sides of a crank 112 on arm 110. Rotary adjustment of arm 110 by pedal 12 serves to change the pitch and catch or spill the air as desired.

Since the fuselage of a jet driven helicopter is suspended on bearings, very little force is required to turn it. Bearing friction tends to turn it with the rotor, down wash from the rotor may affect it, if it is so desired and wind causes it to weather cock unless aerodynamically balanced. These forces are all quite small and so not much force must be transmitted by axle 40 to produce the desired effect. The gears as shown are much larger than it is estimated would be required in actual operation. A small fixed fin may be desirable on the helicopter to aid in directional stability in forward flights, to prevent hunting on a desired course.

Various modifications may be made in the invention without departing from the spirit of the following claims.

I claim:
1. A helicopter comprising a fuselage having comparatively long wings having tip jets, said fuselage having a hollow post, a hub supporting the inner ends of said wings, a teeter bearing between said hub and said post, a lower ring gear carried by said hub, an upper ring gear, an axle for said gears, said axle having a spline connection with said upper gear, means connecting said axle to said post to apply a turning moment to said post, pinions between said ring gears, short variable pitch paddles each having a bearing support in one of said pinions, an operative connection between said axle and the inner ends of said paddles, and means for reciprocating said axle to vary the pitch of said paddles.

2. A helicopter comprising a fuselage having wings, a hub supporting the inner ends of said wings, a lower ring gear carried by said hub, an upper ring gear, an axle for said gears, said axle having a spline connection with said upper gear, a lever arm connecting said axle to said fuselage, pinions between said ring gears, variable pitch paddles each having a bearing support in one of said pinions, an operative connection between said axle and the inner ends of said paddles for varying the pitch of said paddles, and means for reciprocating said axle.

3. A helicopter according to claim 2 comprising a friction drag for said upper ring gear controlled by said axle.

4. A steering control for a helicopter having a fixed fuselage member and a fuselage having a blade-carrying jet propelled rotor, said steering control comprising a lower bevel gear, a driving connection between said gear and said rotor, an upper bevel gear, a torque arm device in torque engagement with said member for turning said fuselage for steering purposes about the axis of said rotor, a coupling between said upper bevel gear and said torque arm device, a planet carrier having pinion gears for said bevel gears, a steering control paddle rotatably carried by each of said pinion gears, and means for varying the pitch of said paddles.

5. A steering control for a helicopter having a stationary fuselage member fixed to the fuselage, said fuselage having a jet propelled blade-carrying rotor having a hub, a radius arm having an outer end having an operative connection with said fuselage member spaced from the axis of said hub for applying a turning moment to said fuselage member, a shaft coaxial with said hub and upon which said arm is fixedly mounted, a power transmission between said hub and said shaft for driving said shaft in one direction or in the opposite direction with power derived from said hub while said hub is rotating in one direction and means for varying the amount and direction of power transmitted by said power transmission from said hub to said shaft.

6. A steering control for a helicopter having a rotor having a bearing support on a hollow post, said steering control comprising a radius arm in said post, said arm having an outer end engageable with said post to apply a turning moment to said post and a power transmission driven by said rotor and comprising means for applying a variable and reversible turning effort to said radius arm.

7. A steering control according to claim 5, said power transmission comprising a bevel gear driven by said rotor, a bevel gear having a driving connection with said arm, planetary pinion gears interposed between said bevel gears and means for varying the speed of said pinion gears.

8. A steering control for a helicopter having a stationary fuselage member fixed to the fuselage and a jet propelled rotor having a hub, a radius arm having an outer end having an operative connection with said fuselage member spaced from the axis of said hub for applying a turning moment to said fuselage member, a shaft coaxial with said hub for said arm, a power transmission between said rotor and said shaft and means for varying the amount and direction of power transmitted by said power transmission, said fuselage member comprising a hollow post having a bearing support for said rotor, said power transmission comprising opposed bevel gears and interposed pinion gears, means supporting one of said bevel gears on and above said rotor, said shaft comprising an axle for said bevel gears, said shaft extending into said post, a spider on said axle for said bevel gears and for said pinion gears, and a driving connection between said axle and said other gear and means supporting said radius arm on said shaft inside of said post, said power varying means comprising paddles each having a shaft in one of said pinion gears and means for adjusting the rotary position of said paddle shafts to vary the pitch of said paddles.

9. A helicopter comprising a fuselage and rotatable wings having a hub, a source of power for driving said wings, an abutment in fixed relation to said fuselage, a torque arm acting on said abutment for applying a turning moment to said helicopter, means driven by said hub for deriving a reversible turning effort for said arm from rotation of said wings by said source of power, said means comprising a reversible power transmission between said hub and said arm for reversing the direction of said turning effort derived from rotation of said wings in the same direction by said source of power.

10. A helicopter comprising a fuselage and rotatable wings having a hub, a source of power for driving said wings, a center post fixed to said fuselage, said center post having a bearing support for said wings, means driven by said hub for deriving a reversible turning effort for said fuselage from rotation of said wings by said source of power, said means comprising a reversible transmission between said hub and said center post for reversing the direction of said turning moment derived from rotation of said wings in a given direction by said source of power.

References Cited in the file of this patent

UNITED STATES PATENTS

| | | |
|---|---|---|
| 2,396,590 | McDougal | Mar. 12, 1946 |
| 2,450,491 | Solovioff et al. | Oct. 5, 1948 |
| 2,481,745 | Hiller | Sept. 13, 1949 |
| 2,619,850 | Chiville | Dec. 2, 1952 |
| 2,644,533 | Maillard et al. | July 7, 1953 |